Nov. 21, 1950     N. E. HART     2,531,124
WEIGHING SCALE INDICATOR
Filed March 6, 1945
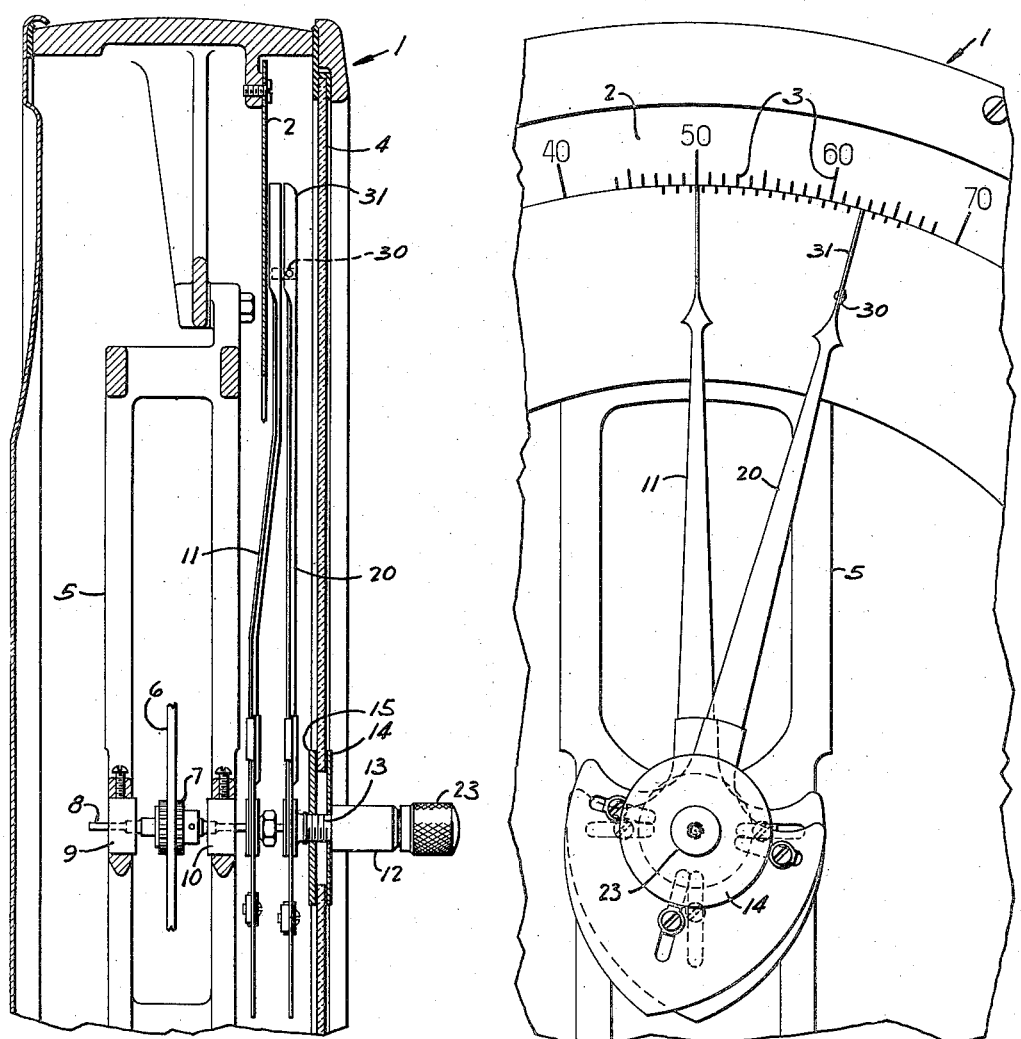
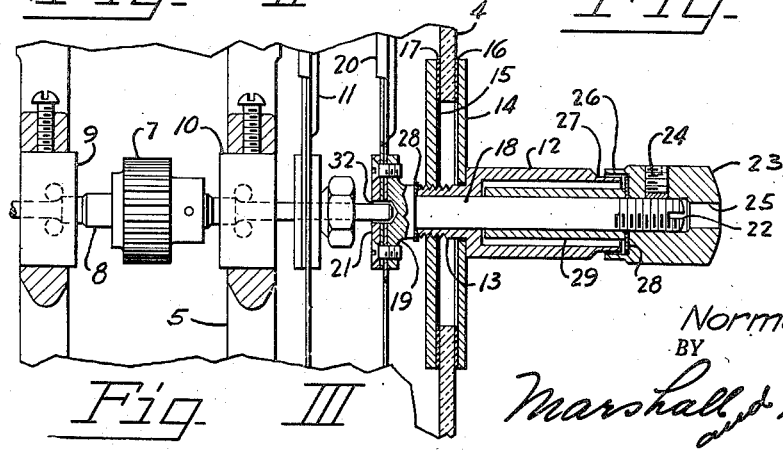
INVENTOR.
Norman E. Hart
BY
Marshall & Marshall
ATTORNEYS Patented Nov. 21, 1950

2,531,124

UNITED STATES PATENT OFFICE 2,531,124

WEIGHING SCALE INDICATOR

Norman E. Hart, Toledo, Ohio, assignor to Toledo Scale Company, Toledo, Ohio, a corporation of New Jersey Application March 6, 1945, Serial No. 581,220

3 Claims. (Cl. 116—129)

This invention relates to weighing scale indicators and in particular to indicators designed to register the maximum load occurring during any particular interval.

Many materials are tested for quality by stressing them to their yield point or their breaking point. Weighing scales are ordinarily employed to measure and indicate the force applied to a sample of the material. It is desirable that means be provided which will indicate the maximum amount of force applied during a particular test and which will indicate that quantity of force even after the sample has failed.

Scales have been built in which the regular weight indicator engages and drives an auxiliary indicator during its forward movement, the auxiliary indicator being left at the maximum indication as the load decreases. In general these devices introduce considerable additional friction into the scale thereby increasing its error as well as being difficult to manufacture and to adjust.

The object of this invention is to provide a simple mounting for a maximum weight indicator which is not only easy to make but which has materially less friction than the devices ordinarily used for this purpose.

Another object of the invention is to provide a maximum weight indicator mounting which may be adjusted entirely from the outside of the weighing scale housing.

Another object is to provide means for adjusting the friction tending to hold the maximum indicator in position.

These and other objects and advantages are attained in the improved indicators an example of which is shown in the drawings.

According to the invention the maximum load indicator comprises an indicator hand mounted on a short shaft journaled in a barrel screwed into a pair of washers which clamp the barrel to the glass front of the indicator housing. The bearing for the shaft carrying the indicator hand is closely adjacent the plane of the indicator while a thimble secured to the outer end of the shaft provides balancing weight to bring the center of gravity of the moving parts within the length of the bearing. This location of the center of gravity of the movable structure provides a minimum of friction by preventing any cocking of the shaft in the bearing.

An example of a maximum weight indicator constructed according to the invention is shown in detail in the accompanying drawings.

In the drawings:

Figure I is a fragmentary front elevation showing a weighing scale indicator, a maximum load indicator, and a portion of a chart cooperating with the indicators.

Figure II is a fragmentary side elevation, partly in section, showing the general alignment of the indicator shafts.

Figure III is a fragmentary elevation at an enlarged scale showing the details of the maximum load indicator mounting.

These specific figures and the accompanying description merely illustrate an example of the invention and are not intended to impose limitations on the claims.

The invention is incorporated in a weighing scale of the dial type in which the load counterbalancing and indicating mechanism is enclosed within a substantially watchcase-shaped housing 1, a portion of which is shown in Figures I and II. An annular chart 2 bearing weight indicia 3 is mounted within the housing 1 behind an enclosing glass front 4. A rectangular frame 5 mounted vertically within the housing 1 is adapted to support the load counterbalancing and indicating mechanism. Inasmuch as the invention does not relate to the load counterbalancing mechanism that mechanism is not shown except for a portion of a rack 6 which meshes with a pinion 7 pinned to an indicator shaft 8. The indicator shaft 8 is journaled in ball bearings 9 and 10 mounted in the frame 5. An indicator 11 attached to the end of the indicator shaft 8 nearest the glass front 4 is adapted to sweep over the annular chart 2 and by cooperation with the indicia 3 to indicate the magnitude of the load being counterbalanced.

A circular hole is cut through the glass front 4 substantially concentric with the axis of the indicator shaft 8. A barrel or sleeve 12 similar in shape to the sleeve of a micrometer caliper is provided with a reduced diameter threaded end 13. A pair of washers 14 and 15 are provided for clamping the barrel 12 to the glass front 4. These parts are assembled by sliding the reduced diameter portion 13 of the barrel 12 through the washer 14, inserting the threaded portion through the hole in the glass front 4 and threading it into the washer 15. Resilient gaskets 16 and 17 inserted between the washers 14 and 15 and the glass front 4 allow the assembly of the barrel 12 and the washers 14 and 15 to be securely clamped in position in alignment with the indicator shaft 8.

A shaft 18 journaled in the reduced diameter portion 13 of the barrel 12 is provided with a flange 19 to which a maximum load indicating hand 20 is secured by a clamping washer 21. The other end of the shaft 18 which extends beyond the end of the barrel 12 is threaded and provided with a screw driver slot 22. A thimble 23 whose periphery is knurled to provide a finger grip to facilitate setting the maximum load indicator is screwed onto the threaded portion of the shaft 18 and is locked in adjusted position by a setscrew 24. The tap drill used to drill the axial hole in the thimble 23 is run all the way through thus leaving a hole 25 through which a screw driver may be inserted to engage the screw driver slot 22 to hold the shaft 18 while the thimble 23 is being adjusted thereon. A rim 26 of the thimble 23 circumjacently overlies without touching a reduced diameter portion 27 of the barrel 12 so as to provide a finished appearance and to prevent the entrance of dirt or other foreign matter into the interior of the barrel 12.

Fiber washers 28 one located within the thimble 23 and another located between the flange 19 and the adjacent end of the reduced diameter portion 13 of the barrel 12 prevent axial metal to metal contact and thereby reduce the friction between the shaft 18 and the barrel 12. The thimble 23 is normally adjusted so that a small amount of end play of the shaft 18 is permitted. The interior of the barrel 12 is hollowed out to provide space for a sleeve 29 which is sometimes used on the shaft 18. The purpose of the sleeve 29 is to increase the load on the bearing supporting the shaft 18 so as to provide a small increase in the friction in the bearing and thus insure more stable operation of the maximum load indicating hand 20.

The maximum load indicating hand 20 has a transverse finger 30 riveted near its tip 31. The finger 30 projects into the path of the end of the weight indicating indicator 11 so that the indicator 11 can drive the maximum load indicator 20 during the forward portion of its movement. The finger 30 is located as near the tip of the indicator 20 as is practical so that the indications will agree even though there may be lack of concentricity between the indicator shaft 8 and the maximum load indicator shaft 18.

The flanged end of the maximum load indicator shaft 18 has a drilled hole 32 concentric with its axis which is adapted to loosely fit over the adjacent end of the indicator shaft 8. This is provided to facilitate the positioning adjustment of the maximum load indicator assembly. When the structure is being assembled it is adjusted in position by loosening the washers 14 and 15 on the barrel 12 and by loosening the thimble 23 from the threaded portion of the shaft 18. This allows the shaft 18 to be pushed toward the indicator shaft 8 until the end of the indicator shaft 8 centers itself in the conical bottom of the drilled hole 32. While the parts are thus held in alignment the barrel 12 is tightened on the washers 14 and 15 so as to clamp it in position and then the thimble 23 is adjusted on the end of the shaft 18 to leave only a perceptible axial movement of the maximum load indicator shaft.

The center of gravity of the maximum load indicator hand 20, the shaft 18 and the thimble 23 lies within the bearing portion of the barrel 12 so that there is no tendency for the shaft 18 to cock or bind in the bearing. Therefore, without the added auxiliary sleeve 29 the assembly has only sufficient friction to hold it in place during normal operation. When the sleeve 29 is added the center of gravity is shifted outward beyond the limits of the bearing so as to produce a slight cocking action which increases the friction over that expected from the mere addition of weight. Thus, a relatively small added mass is required to secure satisfactory operation of the maximum load indicator under vibration or other adverse conditions of use.

Having described the invention, I claim:

1. In an automatic weighing scale in which an indicator carried on an indicator shaft operatively engages during movement in one direction a maximum load indicating pointer to position the pointer at the maximum load indication, a mounting for the maximum load indicating pointer comprising a barrel, a pair of washers secured to the barrel and supporting the barrel from a portion of the scale housing with the barrel aligned with the indicator shaft, said barrel having a bearing in its end adjacent the indicator shaft, a shaft journaled in the bearing and carrying the maximum load indicating pointer on its end adjacent the indicator shaft, and a weighted thimble threaded onto the end of the shaft, the thimble being of sufficient weight so that the composite center of gravity of the thimble, maximum load pointer and shaft is located in the shaft between the ends of the shaft bearing in the barrel.

2. In an automatic weighing scale in which an indicator carried on an indicator shaft operatively engages during movement in one direction a maximum load indicating pointer to position the pointer at the maximum load indication, a mounting for the maximum load pointer comprising a barrel, a pair of washers secured to the barrel for clamping the barrel to a part of the housing of the scale with the barrel in alignment with the indicator shaft, a shaft journaled in the barrel and supporting the pointer, said shaft having an axial generally conical hole, said shaft being mounted with the end of the indicator shaft loosely received in the axial hole, a thimble threaded onto the end of the shaft opposite the pointer, a radial surface on the thimble juxtaposed to the barrel to prevent axial movement of the shaft and frictional engagement between the indicator shaft and the bottom of the conical hole, said thimble being removable to allow axial movement of the shaft and contact between the indicator shaft and the conical hole in the pointer shaft to align the shafts.

3. In an automatic weighing scale in which an indicator carried on an indicator shaft operatively engages during movement in one direction a maximum load indicating pointer to position the pointer at the maximum load indication, a mounting for the pointer comprising a shaft, a hub on the shaft to which the pointer is attached, a barrel having a bearing in its end adjacent the indicator in which bearing the shaft is journaled, a pair of washers secured to the barrel to support the barrel from a position of the housing of the scale, said shaft having an axial hole that loosely receives the end of the indicator shaft, and a nut threaded on the end of the pointer shaft and adjusted to hold the pointer shaft out of frictional contact with the end of the indicator shaft located in the axial hole.

NORMAN E. HART.

REFERENCES CITED

The following references are of record in the file of this patent:

UNITED STATES PATENTS

| Number | Name | Date |
|---|---|---|
| 1,397,518 | Hem | Nov. 22, 1921 |
| 1,407,987 | Crane | Feb. 28, 1922 |
| 1,683,103 | Schlaich | Sept. 4, 1928 |
| 1,686,635 | Mylius et al. | Oct. 9, 1928 |
| 1,864,416 | Canover | June 21, 1932 |
| 1,946,385 | Bryant | Feb. 6, 1934 |
| 2,171,183 | Lamb | Aug. 29, 1939 |
| 2,282,209 | Pepper, Jr., et al. | May 5, 1942 |